United States Patent [19]

Lutze et al.

[11] 4,138,540

[45] Feb. 6, 1979

[54] PROCESS FOR THE MANUFACTURE OF HIGH MOLECULAR COPOLYMERISATES OF ETHYLENE

[75] Inventors: Siegfried Lutze, Gelsenkirchen; Peter Schneller, Oberhausen; Hans-Walter Birnkraut, Oberhausen; Josef Berzen, Oberhausen; Günter Hetkamp, Dinslaken, all of Fed. Rep. of Germany

[73] Assignee: Ruhrchemie Aktiengesellschaft, Oberhausen, Fed. Rep. of Germany

[21] Appl. No.: 792,074

[22] Filed: Apr. 28, 1977

[30] Foreign Application Priority Data

May 14, 1976 [DE] Fed. Rep. of Germany ....... 2621404

[51] Int. Cl.$^2$ .................. C08F 4/64; C08F 210/16
[52] U.S. Cl. .................... 526/159; 252/429 A; 252/429 C; 526/348.2; 526/348.3; 526/348.4; 526/348.5; 526/348.6; 526/348.7; 526/907
[58] Field of Search .............. 526/159, 348, 350, 907; 252/429 A, 429 C

[56] References Cited

U.S. PATENT DOCUMENTS

| | | | |
|---|---|---|---|
| 3,238,145 | 3/1966 | Loeb | 526/159 |
| 3,681,256 | 8/1972 | Blunt | 526/159 |
| 3,773,735 | 11/1973 | Diedrich et al. | 526/350 |
| 3,984,387 | 10/1976 | Liu et al. | 526/352 |

*Primary Examiner*—Alan Holler
*Attorney, Agent, or Firm*—Sprung, Felfe, Horn, Lynch & Kramer

[57] ABSTRACT

A high molecular weight copolymer of ethylene and a $C_3$-$C_{20}$ α-olefin which, after being molded at room temperature and pressure-free tempered at 120 to 250° C. and thereafter cooled, provides molded articles having an ultimate tensile strength of more than 200 kg per square centimeter measured at 120° C. and an impact strength of more than 200 kg cm/cm$^2$ measured at 23° C; a process for the preparation of such a copolymer by a Ziegler catalysis which process is characterized in that the catalyst which is employed is one obtained by reducing a titanium-(IV)-halide with an organo-aluminum compound in an inert solvent such that the concentration of titanium-(III)-halide so formed amounts to 30 to 200 m mol/liter solvent, the $C_3$-$C_{20}$ α-olefin is employed in an amount of 0.05 to 5 weight percent based upon the weight of the ethylene and the catalyst is either initially contacted with $C_3$-$C_{20}$ α-olefin in the absence of ethylene and thereafter contacted with the ethylene or, is initially contacted with a mixture of $C_3$-$C_{20}$ α-olefin and ethylene; and a catalyst for such polymerization.

8 Claims, No Drawings

PROCESS FOR THE MANUFACTURE OF HIGH MOLECULAR COPOLYMERISATES OF ETHYLENE

BACKGROUND OF THE INVENTION

1. Field Of the Invention

This invention relates to a high molecular weight copolymer of ethylene and a $C_{3-20}$ α-olefin. More especially this invention relates to such a high molecular weight copolymer which can be molded at room temperature and, after pressure-free tempering at 120–250° C. followed by cooling, provides a molded article having ultimate tensile strength of more than 200 kg per square cm measured at 120° C. and an impact strength of more than 200 kg cm/cm² measured at 23° C. This invention further relates to a process for the manufacture of such a high molecular weight ethylene-$C_{3-20}$ α-olefin copolymer. Furthermore, this invention relates to a catalyst useful in the preparation of such a high molecular weight copolymer.

2. Discussion Of The Prior Art

It is known that ethylene or other olefins, alone or as a mixture, can be polymerized at low pressure in the presence of catalysts. The latter consist of mixtures of the metals of Group 4A of the periodic system and organoaluminum compounds (Ziegler Process). The procedure allows one to manufacture, among other products, high molecular polymerizates and copolymerizates of ethylene with molecular weights of 500,000 and greater, e.g., 5,000,000 to 8,000,000. The molecular weights reported herein are determined by measuring the viscosity of the polymer solutions.

The high molecular weight polymers are usually in powder form and are converted into molded articles of various types by appropriate processing. These molded articles are of special value when the following properties are required: abrasion resistance, impact strength, resistance to solvents and corrosive chemicals.

Some examples of these types of applications are heavy duty coverings for containers, pipe lines and pieces of apparatus as well as for fast moving machine parts of various types (alone or in combination with other materials e.g., steel), which are exposed to abrasion. They are also useful in the manufacture of artificial limbs and implants.

The manufacture of molded articles from high molecular polyethylene or copolymerizates of ethylene takes place mainly by means of heat compression molding or by extruding the powder to sheets, blocks or sections, from which, if necessary, thinner sheets and smaller molded articles can be made by machining.

This type of processing is very involved and due to the lengthy period which the material is in the mold, under high pressure and at high temperature, only a low rate of manufacture is possible. Moreover, during the machining there is a considerable loss of material.

A simpler method for forming high molecular polyethylene powder has already been attempted as in U.S. Pat. No. 3 847 888. In this instance the powder from the synthesis was ground down to a grain size less than 100 μ. Powders of this type can be molded at room temperature and by subsequent heat treatment converted into completely homogeneous sintered molded articles. Thus, the residence time in the molding press can be reduced and the heating during the molding procedure eliminated. By finely adjusting the mold to the final dimensions of the molded article, the loss of material from any necessary remachining can be minimized.

However, this known procedure results in high costs due to the involved grinding process. Moreover, completely homogeneously molded articles are not always obtained. Particularly with larger molded articles, there is the risk of bubble formation, which impairs the physical properties of the article. Finally, such fine powders are difficult to handle due to the associated dust problems and can even be dangerous under certain circumstances.

It is, therefore, an object of the invention, to provide a process for the manufacture of molded articles from a more easy workable high molecular polymerizate powder which process requires less mechanical and thermal processing, is performed over a shorter period of time and produces molded articles possessing high ultimate tensile and impact strengths.

SUMMARY OF THE INVENTION

In accordance with this invention there is provided a high molecular weight ethylene-$C_{3-20}$ α-olefine copolymer which copolymer can be room temperature molded and, following pressure-free tempering at 120° to 250° C. and cooling, provides molded articles with an ultimate tensile strength of more than 200 kg per cm² measured at 120° C. and an impact strength of more than 200 kg cm/cm² measured at 23° C. Such new and improved copolymers are provided in accordance with this invention by contacting ethylene and a $C_{3-20}$ α-olefin under Ziegler polymerization conditions including a temperature of 20° to 150° C. and a pressure up to 50 bar with a Ziegler catalyst comprising a mixed catalyst of a titanium-(III)-halide and an organoaluminum compound in inert solvent. The process is conducted:

A. employing as the Ziegler catalyst one obtained by reducing a titanium-(IV)-halide with an organoaluminum compound in an inert solvent such that the concentration of titanium-(III)-halide so formed amounts to 30 to 200 m mol/liter solvent;

B. employing the $C_{3-20}$ α-olefin comonomer in amount of 0.05 to 5 weight percent based upon the weight of ethylene; and C1. contacting the catalyst first with the α-olefin in the absence of ethylene and thereafter contacting the catalyst with ethylene; or C2. initially contacting the catalyst with a mixture of said α-olefin and ethylene.

This invention further contemplates a Ziegler catalyst comprising a mixed catalyst of a titanium-(III)-halide and an organoaluminum compound said catalyst prepared by reducing a titanium-(IV)-halide with an organoaluminum compound in an inert solvent such that the concentration of titanium-(III)-halide so formed amounts to 30 to 200 m mol/liter solvent.

In accordance with this invention it has been found that the problems attendant the prior art high molecular weight ethylene copolymers are solved in that there is provided through the described process a high molecular weight copolymer of ethylene with a $C_{3-20}$ α-olefin which can be molded at room temperature. The molded article when pressure-free tempered at 120° to 250° C. and thereafter cooled has exceptional physical properties. It possesses an ultimate tensile strength to more than 200 kg/cm² (measured at 120° C.) and an impact strength of more than 200 kg cm/cm² (measured at 23° C.). Generally speaking the high molecular weight copolymers of this invention have molecular weights determined viscosimetrically between 1,000,000 and 10,000,000 preferably between 3,000,000 and 8,000,000. Generally speaking they are prepared in a particle size of between 0.01 and 1.0 preferably between 0.06 and 0.5 mm It was not foreseeable, an observing the conditions in accordance with the invention including the manufacture of the catalyst component (titanium-(III)-compound) under certain conditions and copolymerization of ethylene with defined amounts of a higher α-olefin that copolymerizates would result which can be molded into articles with especially advantageous physical properties.

Usually the concentration of the reaction components for the manufacture of the mixed catalysts in solvent has no effect on the mechanical properties of polymerizates produced using this catalyst.

Furthermore, it is not possible to predict the effect of a certain comonomer share on the moldability of a polymerizate. It is of course known in the case of polymerizates for example, that crystallinity and density are interdependent or the tendency to crack through stress can be affected by the addition of comonomers. The relationship between the comonomer share and the moldability of polymerizates is, at least as far as high molecular polyethylene is concerned, an unknown area.

In the process according to the invention, the usual Ziegler catalysts are employed in the polymerization. Especially suitable are mixed catalysts consisting of trivalent titanium halides which result from the reduction of corresponding tetravalent titanium compounds such as $TICl_4$ or $TiBr_4$. The reducing agents are organoaluminum compounds such as triethylaluminum, trisobutylaluminum, isoprenylaluminum, diethylaluminum hydride or halogen containing organoaluminum compounds such as diethylaluminum sesquichloride or mixtures thereof.

The reduction of titanium-(IV)-halide to a titanium-(III)-halide by means of the organoaluminum compound takes place in the usual way in an inert solvent. Suitable solvents are aliphatic or alicyclic hydrocarbons such as butane, pentane, hexane, cyclohexane or aromatic hydrocarbons such as benzene and xylene or petroleum spirit or hydrogenated diesel oil fractions. Finally, the aliphatic or aromatic hydrocarbon halides can be used. The solvent must be carefully purified and in particular be free of moisture and oxygen.

An essential feature of the invention on hand is the observation of certain exactly defined concentration ratios during the manufacture of the titanium-(III)-halide by reduction of the titanium-(IV)-halide in an inert solvent. The titanium-(IV)-halide, preferably $TiCl_4$, and the organoaluminum compound, preferably diethylaluminum chloride and/or triethylaluminum must be employed in such amounts that the concentration of the titanium-(III)-halide suspended in the solvent amounts to 30 to 200 m mol/liter solvent, preferably 50 to 150 m. mol/liter solvent. It is important, that the concentration range mentioned results during the manufacture of the titanium-(III)-halide suspension. The reason is that a dilution of the concentrated Ti-(III)-halide suspension, by addition of solvent after the reduction of the Ti-(IV)-halide, does not lead to catalysts with the desired properties.

The titanium-(III)-compound resulting from the reduction is washed with an inert organic liquid, preferably with the same as was used as reaction medium whilst carefully excluding oxygen and moisture.

The titanium halide is employed in this form, together with one of the named organoaluminum compounds, preferably diethylaluminum chloride and/or triethylaluminum or a mixture of various organoaluminum compounds, as activator for the copolymerization of ethylene with higher α-olefins.

Suitable higher α-olefins are in particular propene, butene-(1), hexene-(1), octene:(1), decene-(1), dodecene-(1) or octadecene-(1) as well as higher branched α-olefins, such as 3-methylbutene-(1) or 4-methylpentene-(1).

In the process according to the invention, the higher α-olefins are introduced in amounts corresponding to 0.05 to 5 weight percent, preferably 0.1 to 3 weight percent, relative to ethylene. relative to ethylene.

Amounts of less than 1 weight percent are sufficient in order to obtain polymerizates which can be molded to articles with the desired properties. An additional of more than 5 weight percent of the higher α-olefin results in the tensile values falling below the desired ones.

The copolymerization of ethylene and higher α-olefins can take place in the following manner, the catalyst is brought into contact with the higher α-olefin and then ethylene is reacted with the resulting reaction product or ethylene and a higher α-olefin (as mixture) are reacted with the catalyst. The polymerizate powder — mainly of particle size between 0.06 and 0.5 mm — is formed under the known conditions of the Ziegler synthesis in the particle forming process. Hydrocarbons are employed as suspension agents at temperatures up to 150° C. and pressures up to 50 bar. The mean molecular weight (above 1,000,000, measured viscometrically in solution) is attained by adjusting the amount of catalyst and/or by addition of mono or polyhydric aliphatic alcohols. Alcohols with 2 to 5 carbon atoms are preferred. Butanol has been found to be especially useful.

Ethylene and the comonomers employed in the polymerization should be carefully purified before the polymerization. It should be ensured that moisture, carbon monoxide, acetylene hydrocarbons and sulfur compounds are not present. The oxygen content should not amount to more than 5 ppm.

The polymerizate powders are separated from the suspension medium, if necessary suitably treated, in order to remove catalyst and traces of suspension agent, and dried. They are then molded at room temperature at a pressure of 150 to 800 kg/cm$^2$, preferably 400 to 600 kg/cm$^2$. The articles can be removed from the mold and transported without any danger of damage. Plasticizing takes place by tempering, without application of external pressure, in a heating appliance at temperatures above the crystallite melting point. The tempering period is determined by the volume of the molded articles and the applied temperature. Temperatures between 150° and 200° C. have been found to be especially suitable.

The subsequent cooling can take place without application of pressure. In order to completely avoid pockets and in order to obtain the desired properties with larger molded articles, it is necessary to conduct the cooling in an appropriate mold under pressure. The latter can amount up to 1,200 kg/cm$^2$ depending on form and size of the mold. The residence time of the powder or the article in the mold amounts to 15 to 20 minutes according to the process of the invention, in contrast to several hours for the conventional processing of equally large molded articles from known products.

The testing of such manufactured molded articles showed that they had tensile strengths of more than 200 kg/cm$^2$ at 120° C. and impact strengths of more than 200 kp. cm/cm$^2$ at 30° C.

In order to more fully illustrate the nature of the invention and the manner of practicing the same the following examples are presented. It is to be understood that the examples set forth herein are for the purpose of illustrating the invention and not of limiting the same.

EXAMPLES

EXAMPLES 1 to 3

(a) Manufacture of the Catalyst 395 m mol TiCl$_4$ were dissolved in a 130° to 170° C. boiling waterfree hydrogenated hydrocarbon fraction at a concentration of 500 g/liter. The solution was added dropwise whilst stirring to 753 m mol diethylaluminum chloride (DEAC), dissolved in 4 liters of the aforementioned solvent in a dry 6 liter flask under nitrogen (temp. 20° C.). After 6 hours stirring at the same temperature, the brown precipitate was washed by twice decanting and refilling with the aforementioned hydrocarbon fraction. The resulting suspension contained 92 m mol TiCl$_3$/liter solvent.

(b) Polymerization 25 liters of a hydrogenated hydrocarbon fraction, with boiling point range 130° to 170° C, were introduced into a 40 liter enamel reactor previously dried and flushed with nitrogen. It was then brought to a temperature of 80° C. Successively, 45 m mol DEAC. 45 m mol of the catalyst described under 1a) and 10 or 50 or 250 g hexene-(1) were introduced whilst stirring. Stirring was continued for 30 minutes at a temperature of 80° C. and finally 800 liters of ethylene were introduced per hour.

The pressure in the reactor slowly increased to a maximum of 2.5 bar. After 5 hours the reaction was interrupted, the cooled reactor content filtered and the polymer powder washed with isopropanol and dried. 4.8 to 5.0 kg ultra high molecular ethylene copolymerization was obtained with the properties listed in Table 1. To determine the ultimate tensile strength and the impact strength, round plates of 15 mm in height and 154 mm in diameter were made. They were manufactured by molding the polymerizate powder for 1 minute at room temperature at a pressure of 400 kg/cm$^2$, then tempering for 2 hours at 200° C. and finally cooling for 15 to 20 minutes under pressure. The latter was increased from 500 initially to 1,000 kg/cm$^2$.

EXAMPLE 4

A further experiment was conducted in accordance with the conditions outlined in examples 1 to 3, the difference being that 30 g hexene-(1) were employed and introduced with the ethylene into the reactor over the whole period of reaction (5 hours). Hexane-(1) was diluted with the same solvent as was employed in the reactor as suspension agent in order to simplify the dosing. 5.0 kg polymerizate were formed. After processing by means of molding in accordance with Examples 1 to 3, molded articles were obtained possessing ultimate tensile and impact strengths as shown in Table 1.

EXAMPLE 5

45 m mol of the catalyst described under (a) in Examples 1-3 were stirred for 15 hours at 35° C. in a 2 liter flask with a nitrogen atmosphere in the presence of 15 m mol DEAC with 10 g decene-(1). The catalyst was then introduced instead of using the catalyst as in Examples 1-3 under (b). The polymerization was conducted in accordance with Examples 1-3 under (b) without the further addition of a higher α-olefin. 4.9 kg of a polymerizate were formed, which were then molded to round plates in accordance with the conditions outlined in Examples 1-3 under (b) — however without employing external pressure during the cooling process. The ultimate tensile and impact strengths of these molded articles are reproduced in Table 1.

Comparative Example 6

A further experiment was conducted according to the condition of the Examples 1-3 with the difference that the polymerization took place without the insertion of a higher α-olefin leading to the formation of a homogeneous ethylene polymerization. Not only the ultimate tensile strength at 120° C. but also the impact strength of the resulting molded plates lay markedly below the values for the plates obtained from the polymerizates in Examples 1, 2, 4 and 5 (c.f. Table 1).

Comparative Example 7

(a) Manufacture of the Catalyst 789 m mol TiCl$_4$, dissolved in a water-free hydrogenated hydrocarbon fraction of boiling point range 130°-170° C., at a concentration of 250 g/liter were added dropwise into a dry 6 liter flask with nitrogen atmosphere containing 1,507 m mol DEAC dissolved in 2.6 liters of the same solvent. Stirring took place at 20° C. during this process. The after treatment of the resulting precipitate, in accordance with Examples 1 to 3 under (a), lead to a concentrated catalyst suspension with 240 m mol TiCl$_3$/liter solvent.

(b) Polymerization

A 45 m mol TiCl$_3$ portion from the catalyst suspension was stirred for 15 hours at 35° C. in a 2 liter flask under nitrogen in the presence of 15 m mol DEAC and 30 g hexene-(1). Thereafter it was employed in the polymerization of ethylene using the conditions outlined in Examples 1-3 under (b). 4.85 kg polymerization was formed. A plate made by molding the polymerizate has a good ultimate tensile strength at 120° C., however, the impact strength lay noticeably below the required value of 200 kp cm/cm$^2$ (c.f. Table 1).

Table 1

| Example No. | α-Olefin (Wt. %) | Particle size distribution (Wt. %) | | | | | Ultimate Tensile Strength at 120°,C (kp/cm$^2$C) | Impact Strength* (kp cm/cm$^2$) |
|---|---|---|---|---|---|---|---|---|
| | | >0.5 | 0.25 to 0.50 mm | 0.10 to 0.25 mm | 0.06 to 0.10 mm | <0.06 mm | | |
| 1 | 0.2 hexene | 0.1 | 0.4 | 35.0 | 55.0 | 9.0 | 207 | 268 |
| 2 | 1.0 hexene | 1.8 | 1.5 | 51.1 | 41.6 | 4.0 | 209 | 277 |
| 3 | 5.2 hexene | 0.1 | 0.3 | 56.9 | 40.1 | 2.6 | 188 | 254 |
| 4 | 0.6 hexene** | 0.7 | 0.6 | 39.1 | 54.5 | 5.1 | 236 | 258 |
| 5 | 0.2 decene | 5.1 | 13.7 | 38.4 | 33.2 | 9.6 | 205 | 224 |

Table 1-continued

| Example No. | α-Olefin (Wt. %) | Particle size distribution (Wt. %) | | | | | Ultimate Tensile Strength at 120° C (kp/cm$^2$C) | Impact Strength** (kp cm/cm$^2$) |
|---|---|---|---|---|---|---|---|---|
| | | >0.5 | 0.25 to 0.50 mm | 0.10 to 0.25 mm | 0.06 to 0.10 mm | <0.06 mm | | |
| Cf. 6 | 0.0 | 0.3 | 2.3 | 78.6 | 15.7 | 3.1 | 149 | 169 |
| Cf. 7 | 0.6 hexene | 0.9 | 16.9 | 27.6 | 35.0 | 13.6 | 236 | 161 |

*Deutsche Industrie Norm 53 453, Double notch, 15° C, each 3mm deep
**continuous addition during the whole polymerization period.

What is claimed is:

1. In a process for the manufacture of a high molecular weight copolymer of ethylene with a higher α-olefin comonomer wherein ethylene and the comonomer are contacted under Ziegler polymerization conditions comprising a temperature of 20 to 150° C. and a pressure up to 50 bar with a Ziegler catalyst comprising a mixed catalyst of a titanium-(III)-halide and an organoaluminum compound in an inert solvent, the improvement which comprises:

A. employing as the catalyst one obtained by reducing a titanium-(IV)-halide with diethylaluminum chloride in an inert solvent such that the concentration of titanium-(III)-halide so formed amounts to 30 to 200 m mol/liter solvent;

B. employing as the higher α-olefin comonomer 0.05 to 5 weight percent, based on the weight of ethylene, of an α-olefin having 3 to 20 carbon atoms; and C1. contacting the catalyst first with α-olefin in the absence of ethylene and thereafter contacting said catalyst with ethylene; or C2. intially contacting said catalyst with a mixture of said α-olefin and ethylene.

2. A process according to claim 1 wherein the concentration of titanium-(III)-halide formed in step A amounts of 50 to 150 m mol/liter solvent.

3. A process according to claim 1 wherein the $C_{3-20}$ α-olefin is employed in an amount of 0.3 to 1 weight percent, based upon the weight of ethylene.

4. A process according to claim 1 wherein the $C_{3-20}$ α-olefin is selected from the group consisting of propene, butene-(1), hexene(1), octene-(1), decene-(1), dodecene-(1), octadecene-(1), 3-methylbutene-(1) and 4-methylpentene-(1).

5. A high molecular weight ethylene-$C_{3-20}$ α-olefin copolymer which can be molded to an article at room temperature which article when pressure-free tempered at 120 to 250° C. followed by cooling possesses an ultimate tensile strength of more than 200 kg/cm$^2$ measured at 120° C. and an impact strength of more than 200 kg cm/cm$^2$ measured at 23° C.

6. A copolymer according to claim 5 having a molecular weight between 1,000,000 and 10,000,000.

7. A molded article of a ethylene-$C_{3-20}$ α-olefin copolymer having an ultimate tensile strength of more than 200 kg cm/cm$^2$ measured at 120° C. and an impact strength of more than 200 kg cm/cm$^2$ measured at 23° C.

8. A copolymer according to claim 5 having a molecular weight between 3,000,000 and 8,000,000.

UNITED STATES PATENT AND TRADEMARK OFFICE
CERTIFICATE OF CORRECTION

PATENT NO. : 4,138,540
DATED : February 6, 1979
INVENTOR(S) : SIEGFRIED LUTZE et al.

It is certified that error appears in the above-identified patent and that said Letters Patent are hereby corrected as shown below:

Column 3, line 6, "an" should read -- on --.

Column 4, line 15, delete "relative to ethylene" second occurrence.

Column 4, line 18, "additional" should read -- addition --.

Column 5, line 43, "copolymerization" should read -- copolymerizate --.

Column 6, line 54, "polymerization" should read -- polymerizate --.

Column 6, line 55, "has" should read -- had --.

Signed and Sealed this

Seventh Day of August 1979

[SEAL]

Attest:

LUTRELLE F. PARKER
*Attesting Officer*  *Acting Commissioner of Patents and Trademarks*